(12) United States Patent
Billiet

(10) Patent No.: US 10,376,825 B2
(45) Date of Patent: Aug. 13, 2019

(54) FILTER APPARATUS FOR FILTERING A STREAM OF GAS

(71) Applicant: NORGREN LIMITED, Staffordshire (GB)

(72) Inventor: Colin Billiet, Gateshead Tyne and Wear (GB)

(73) Assignee: Norgren Limited, Staffordshire (GB)

( * ) Notice: Subject to any disclaimer, the term of this patent is extended or adjusted under 35 U.S.C. 154(b) by 155 days.

(21) Appl. No.: 15/306,940

(22) PCT Filed: May 11, 2015

(86) PCT No.: PCT/GB2015/051379
§ 371 (c)(1),
(2) Date: Oct. 26, 2016

(87) PCT Pub. No.: WO2015/170125
PCT Pub. Date: Nov. 12, 2015

(65) Prior Publication Data
US 2017/0050138 A1    Feb. 23, 2017

(30) Foreign Application Priority Data
May 9, 2014    (GB) .................................. 1408222.6

(51) Int. Cl.
*B01D 46/00*    (2006.01)
*B01D 46/24*    (2006.01)

(52) U.S. Cl.
CPC ..... *B01D 46/2414* (2013.01); *B01D 46/0004* (2013.01); *B01D 46/2411* (2013.01); *B01D 2265/027* (2013.01); *B01D 2265/028* (2013.01); *B01D 2265/05* (2013.01)

(58) Field of Classification Search
None
See application file for complete search history.

(56) References Cited

U.S. PATENT DOCUMENTS

| | | | |
|---|---|---|---|
| 4,925,466 A * | 5/1990 | Overby | B01D 46/0004 55/319 |
| 8,211,219 B2 | 7/2012 | Schuster et al. | |
| 2003/0226790 A1* | 12/2003 | Brown | B01D 29/96 210/90 |
| 2004/0035097 A1* | 2/2004 | Schlensker | B01D 46/0012 55/498 |

(Continued)

FOREIGN PATENT DOCUMENTS

| | | |
|---|---|---|
| CN | 2799053 Y | 7/2006 |
| CN | 103702733 A | 4/2014 |

(Continued)

*Primary Examiner* — Duane Smith
*Assistant Examiner* — Brit E. Anbacht
(74) *Attorney, Agent, or Firm* — The Ollila Law Group LLC

(57) ABSTRACT

A filter apparatus for filtering a stream of gas is disclosed. The apparatus has a head with an inlet and an outlet, the head also having a first flow conduit connected to the inlet and a second flow conduit the outlet. The apparatus also has a filter and a bowl which contains the filter and is connected to the head. The bowl an annular recess. There is also a connector for connecting the filter to the head and the bowl. The part of the connector that engages the bowl has a protrusion that is inserted into the recess.

6 Claims, 4 Drawing Sheets

(56) References Cited

U.S. PATENT DOCUMENTS

| | | | |
|---|---|---|---|
| 2005/0000886 A1* | 1/2005 | Reynolds | B01D 29/21 |
| | | | 210/450 |
| 2006/0157403 A1* | 7/2006 | Harder | B01D 27/005 |
| | | | 210/445 |
| 2007/0084785 A1* | 4/2007 | Schuster | B01D 45/18 |
| | | | 210/435 |
| 2007/0271884 A1* | 11/2007 | Pearson | B01D 46/0012 |
| | | | 55/410 |
| 2009/0078626 A1 | 3/2009 | Krull et al. | |
| 2009/0078926 A1 | 3/2009 | Lee | |
| 2010/0058930 A1 | 3/2010 | Schuster et al. | |
| 2010/0224539 A1 | 9/2010 | Luther et al. | |
| 2010/0224549 A1 | 9/2010 | Micke et al. | |
| 2011/0296999 A1* | 12/2011 | Foerster | B01D 46/0039 |
| | | | 96/419 |
| 2014/0150388 A1* | 6/2014 | Girondi | B01D 46/2411 |
| | | | 55/504 |
| 2015/0090653 A1* | 4/2015 | Kotale | B01D 35/30 |
| | | | 210/236 |
| 2016/0271533 A1* | 9/2016 | Honermann | B01D 35/153 |

FOREIGN PATENT DOCUMENTS

| | | |
|---|---|---|
| EP | 1870152 A1 | 12/2007 |
| JP | 0910533 A | 1/1997 |
| JP | 2009050816 A | 3/2009 |
| WO | 0126777 A1 | 4/2001 |
| WO | 2015170125 A1 | 11/2015 |

* cited by examiner

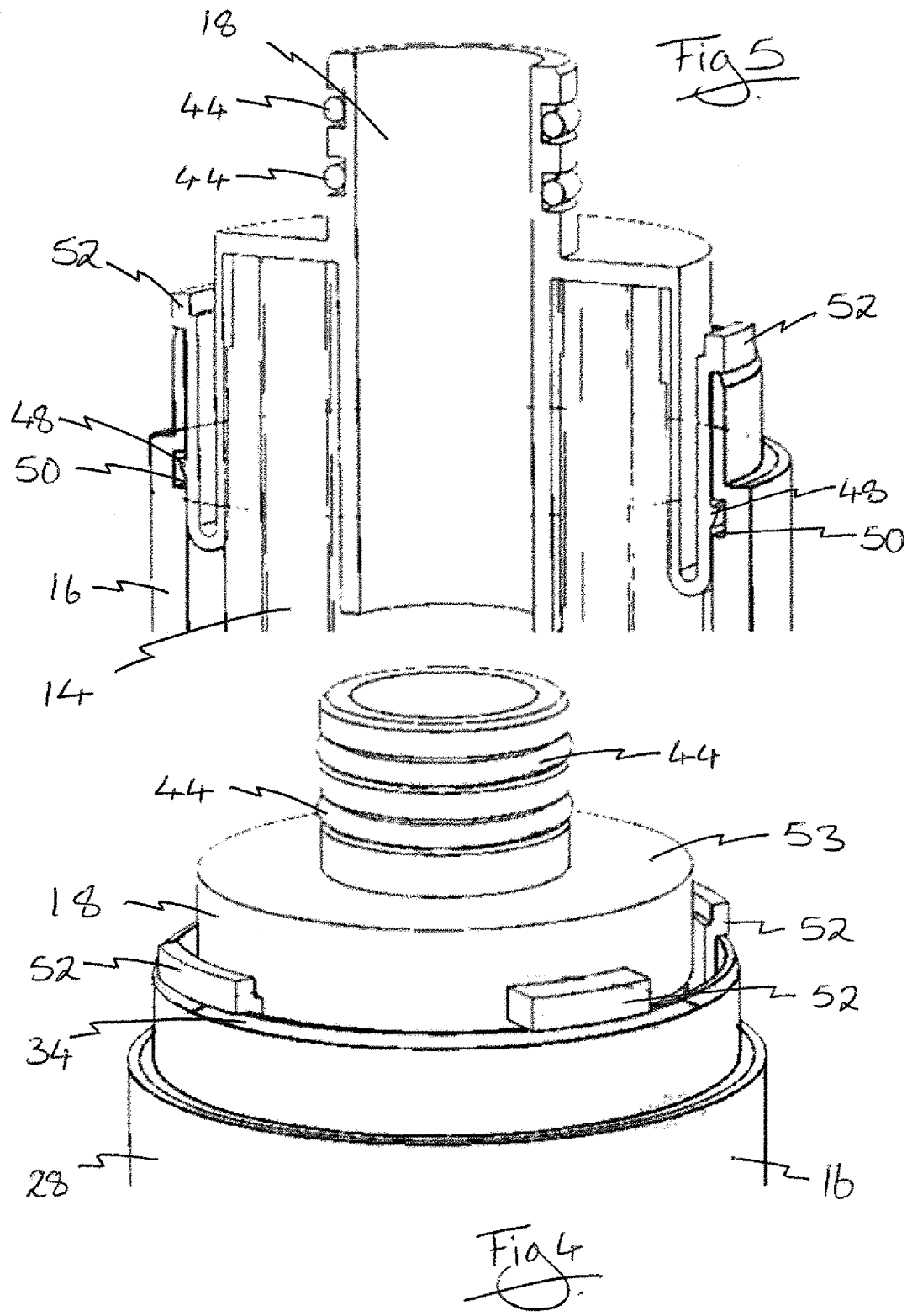

US 10,376,825 B2

FILTER APPARATUS FOR FILTERING A STREAM OF GAS

FIELD OF THE INVENTION

The present invention relates to a filter apparatus for filtering a stream of gas and relates particularly, but not exclusively, to an apparatus for filtering a stream of compressed air.

BACKGROUND

Compressed air is widely used throughout industry as a safe and reliable source of energy. However, the quality of the compressed air delivered directly from the compressor is unsuitable for most uses without treatment to improve its purity. Treating compressed air generally involves filtering it, to remove oil and particulates, and drying it to remove moisture.

A typical example of a filter apparatus includes a filter head, which contains an inlet and an outlet, and a bowl, which threadingly engages the head to form a sealed vessel, within which a filter member is contained. The filter member is typically a tube sealed at one end, is attached to the filter head and sits within the filter bowl. A pair of conduits formed in the filter head direct air to and from the filter member. A first conduit directs the air from the inlet into the centre of the filter, the air flows through the tubular wall of the filter, up the sides of the filter bowl and then through a second conduit, which surrounds the first conduit, directing the air to the outlet. In this example the air is flowing from the inside of the filter to the outside but this flow can be reversed so that the air flows from the outside of the filter to the inside.

Maintenance of such devices includes the changing of the filter. This is done by unscrewing the bowl from engagement with the head so as to expose the filter which can then be disengaged from the filter head and replaced. However, in confined spaces the removal of the filter bowl can be extremely awkward and sufficient space must be left around the filter apparatus to allow the maintenance to take place. This additional space present significant design limitations to the use of this type of filter in certain situations. Furthermore, when a filter is being replaced it is often coated around its outside with a layer of oil making the used filter difficult and messy to handle.

SUMMARY

Preferred embodiments of the present invention seek to overcome the above described disadvantages of the prior art.

According to the present invention there is provided a filter apparatus for filtering a stream of gas, the apparatus comprising:
a head having an inlet and an outlet, the head including a first flow conduit connected to one of said inlet and said outlet and a second flow conduit connected to the other of said inlet and said outlet;
a filter for filtering the gas flowing though the filter apparatus;
a bowl connected to and sealed relative to said head for containing said filter, said bowl having at least one internal surface having at least one recess therein;
a connector for connecting said filter to said head and said bowl, the connector including:
   a head engaging portion for engaging and sealing around said second flow conduit;
   a filter engaging portion for retaining said filter, said connector thereby directing the flow of the gas between said filter and said second flow conduit; and
   a bowl engaging portion having at least one protrusion for insertion into said recess.

By providing a connector that engages and joins the head, filter and bowl and has a protrusion that is received in a recess in the bowl, the advantage is provided that the filter will be retained within the bowl when the bowl is being separated from the filter head. As a result, it is not necessary to pass the bowl over the length of the filter when the filter head and bowl are being separated, which normally takes place so that the filter can be changed. The presence of the recess in the bowl and the protrusion in the connector allows the force required to separate the connector (and therefore the filter attached thereto) from the bowl to be controlled so that it is greater than the force required to separate the connector from the filter head. It is therefore possible to use the filter apparatus of the present invention in many more locations than is possible in the prior art as only a small space below the bowl is required in order to allow sufficient room for the bowl and filter to be removed. Furthermore, by retaining the filter within the bowl, the handling of the dirty filter is much easier because the filter is then handled by gripping the connector which is relatively clean compared to the filter element.

In a preferred embodiment the bowl engaging portion comprises at least one flexible member with said protrusion located thereon.

By forming the bowl engaging portion so as to include one or more flexible members with the protrusion located thereon provides the advantage that the flexible members can urge the protrusion into engagement with the recess in the bowl but can also be flexed so that the protrusion is not within the recess thereby allowing the connector, and filter attached thereto, to be easily removed from the bowl when this is required. At the same time the flexible member makes it unlikely that the protrusions will accidentally become disengaged from the recesses and therefore the connector is unlikely to separate from the bowl before separating from the filter head.

The flexible member may comprise manual engaging portions allowing an operator to flex of the flexible members.

By providing manual engaging portions the advantage is provided that the flexible members can be easily flexed radially inwards so that the protrusions are not in the recess, thereby allowing easy removal of the filter from the bowl.

In a preferred embodiment the manual engaging portions in use are located adjacent an edge of said bowl.

By providing the manual engaging portions adjacent an edge of the bowl means that when the bowl and the head are fixed together the head further prevents any movement of connector thereby ensuring that the filter cannot become detached from the head which would allow the gas to bypass the filter. Furthermore, locating the manual engaging portions adjacent the upper edge of the bowl means that they remain as far away as possible from the dirt and oil associated with a used filter. As a result, once the bowl has been removed from the filter head the manual engaging portions are simply moved radially inwards. This releases the filter from the bowl but also acts as the point at which the connector and filter are handled by an operator, allowing the operator to remove the filter without touching the oil or dirt.

In another preferred embodiment the recess is annular.

By having an annular recess the advantage is provided that the connector can be inserted into the bowl at any rotational angle and correct engagement with the protrusion will occur. Furthermore, as the filter bowl is initially unscrewed, the annular recess allows the protrusions to run within the recess. This allows the connector and filter to remain rotationally fixed to the filter head. When the filter bowl is removed from the filter head there are two areas of seals that must be released in order that the separation can take place. The first of these is the seal between the filter bowl and the filter head and the second is between the connector and the filter head. Because the protrusions are able to run around the annular recess when the bowl is initially rotated relative to the head it is only the stiction of the seal between the filter bowl and the filter head that must be overcome. As a result, the operator is required to apply less rotational force to the filter bowl in order to start that separation. Once the stiction of the seal between the head and bowl has been overcome the mechanical advantage of the thread slowly separates the connector from the filter head which is drawn out axially. As a result, the mechanical advantage of the thread overcomes of the stiction of the seal between the connector and the filter head. If the connector had to rotate with the filter bowl then the stiction force of both sealing areas would have to be overcome at the same time making the initial rotation of the bowl relative to the head extremely difficult.

In a further preferred embodiment the filter is fixedly connected to said connector.

The first flow conduit is preferably located substantially around said second flow conduit.

DESCRIPTION OF THE DRAWINGS

Preferred embodiments of the present invention will now be described, by way of example only, and not and in any limitative sense with reference to the accompanying drawings in which:

FIG. 4 is a perspective view of a portion of the apparatus of FIG. 3; and

FIG. 5 is a sectional perspective view of the portion of the apparatus of FIG. 4.

DETAILED DESCRIPTION

Figure 1:
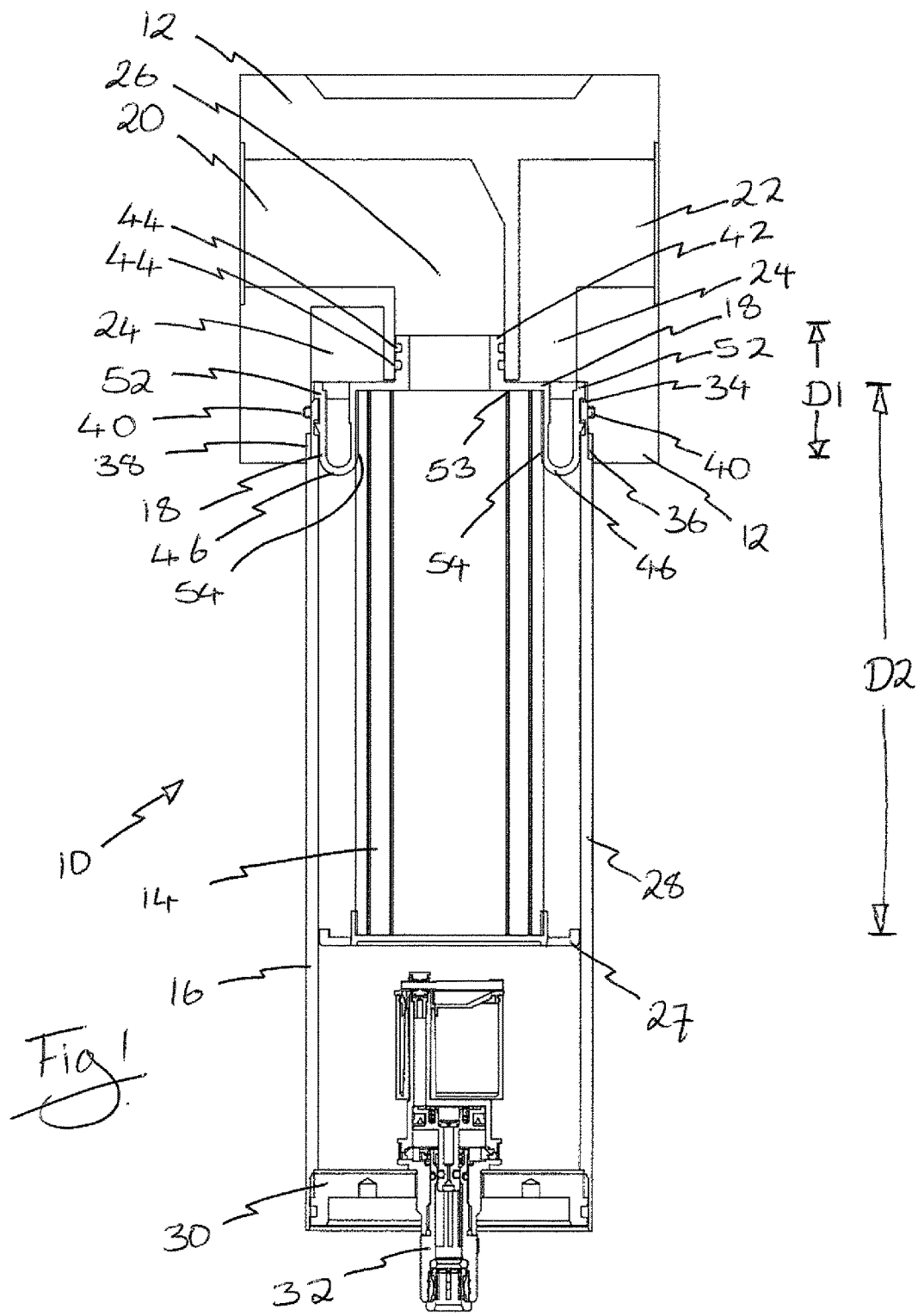
FIG. 1 is a sectional front view of a filter apparatus of the present invention.

Referring to FIG. 1, a filter apparatus 10 is shown and this apparatus is used to filter a stream of gas. In particular, the apparatus 10 is used to filter a stream of compressed air, this being typically undertaken prior to a drying step in a compressed air purification process. The four main components of the filter apparatus are a head 12, a filter 14, a bowl 16 and a connector 18 which connects the head, filter and bowl together.

The filter head 12 has an inlet 20 for receiving the stream of compressed air. The head 12 also has an outlet 22 through which the compressed air passes on to downstream apparatus (not shown). The stream of compressed air passes to and from the filter via first and second conduits 24 and 26. The first conduit 24 substantially surrounds the second conduit 26 where it enters the bowl 16 and carries the stream of air that has been filtered to the outlet. The second conduit 26 is radially inward of the first conduit 24 and directs the stream of compressed air into the central bore of the tubular filter 14 prior to filtering.

The filter 14 is a standard tubular filter of a type familiar to person skilled in the art and is used to remove solid particulate and condensed liquid droplets of a size above a predetermined value. The filter media could for example be a spun bonded polymer with a micron rating of 3 to 100μ. Such material has an open structure, with voids of greater than 80%, and provides a second stage filtration typically to a particle size of 5 to 10μ. Another example is a microfiber coalescing filter with oil carryover of 0.01-1 mg/m3. The filter 14 has a base 27 which fixes to the end of the filter furthest away from the head 12. The base 27 typically has legs that extend beyond the diameter of the filter 14 and engage the internal walls of bowl 16 so as to locate the filter 14 approximately centrally within the bowl 16.

The bowl 16 has a tubular body 28 and an end cap 30 through which an exhaust valve 32, for exhausting liquid water, is located. Towards the uppermost edge 34 of wall 28 an external thread 36 is provided to engage an internal thread 38 formed in head 12. An O-ring seal 40 is provided in an annular recess in head 12 so that when the threads 36 and 38 are engaged the filter head 12 and bowl 16 together form a vessel capable of retaining the compressed air at high pressure. The bowl 16 is typically made from extruded aluminium and in the embodiment shown in FIG. 1 the head 12 is cast aluminium.

The connector 18 is formed from a thermoplastic material by injection moulding and has portions which engage the head 12, filter 14 and bowl 16. The head engaging portion 42 is tubular and is sized to fit within the tubular end of second conduit 26. A pair of O-rings 44 are located in annular recesses within the head engaging portion 42 to provide a seal between the connector 18 and the second conduit 26 to prevent any compressed air bypassing the filter and leaking directly into the first conduit 24. Because the pressure differential between the second conduit 26 and the first conduit 24 is quite small, being only the pressure drop resulting from the compressed air passing through filter 14, the interference fit provided by the O-ring seals 44 is sufficient to seal the connector 18 relative to the second conduit 26.

The bowl engaging portions of connector 18 are in the form of flexible members 46. The connector is preferably provided with two or more such flexible members in the form of flexible U-shaped legs. Each leg has a protrusion 48 (see FIG. 5) which is received in an annular recess 50 formed in the inner surface of wall 28 adjacent the upper edge 34. The protrusion 48 is wedge shaped thereby providing a cam surface which flexes the flexible members 46 radially inward as the connector 18 moves into the bowl 16. Each flexible member 46 has a manual engaging portion 52 which, when the connector 18 is engaged with the bowl 16, sits just above and in engagement with the upper edge 34 of wall 28. The head engaging portion 42 is attached to the flexible members 46 by an annular disk 53.

The filter engaging portion of connector 18 is the inner surface 54 of flexible member 46. The filter 14 is attached to the connector 18 by an adhesive sticking it to this inner surface 54.

Figure 2:
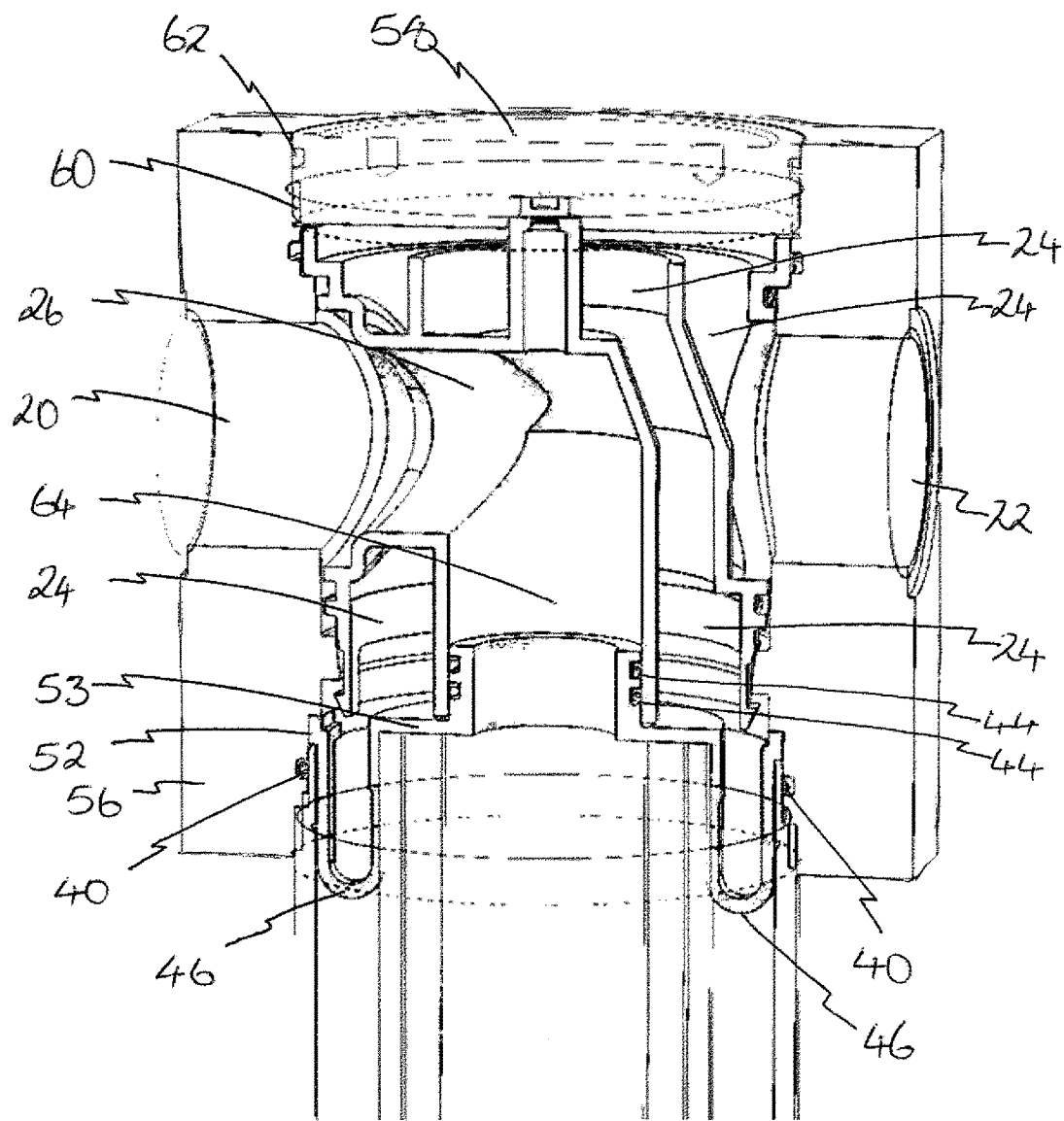
FIG. 2 is a sectional perspective view of a portion of a filter apparatus of another embodiment of the present invention.

Referring to FIG. 2, the embodiment shown therein is the same as that described in connection with FIG. 1 except that the head 12 is not cast as a single component but is instead formed from multiple components. These include a body 56, which is formed by extrusion of aluminium, and an end plate 58, which is also formed by extrusion. The end plate 58 is fixed to the body by mutually engaging threads, indicated at 60, and sealed by an O-ring located in a recess indicated at 62. The first and second conduits 24 and 26 are formed by an insert 64, which is formed by injection moulding of thermoplastic material and is located in an aperture formed in extruded body 56.

Figure 3:
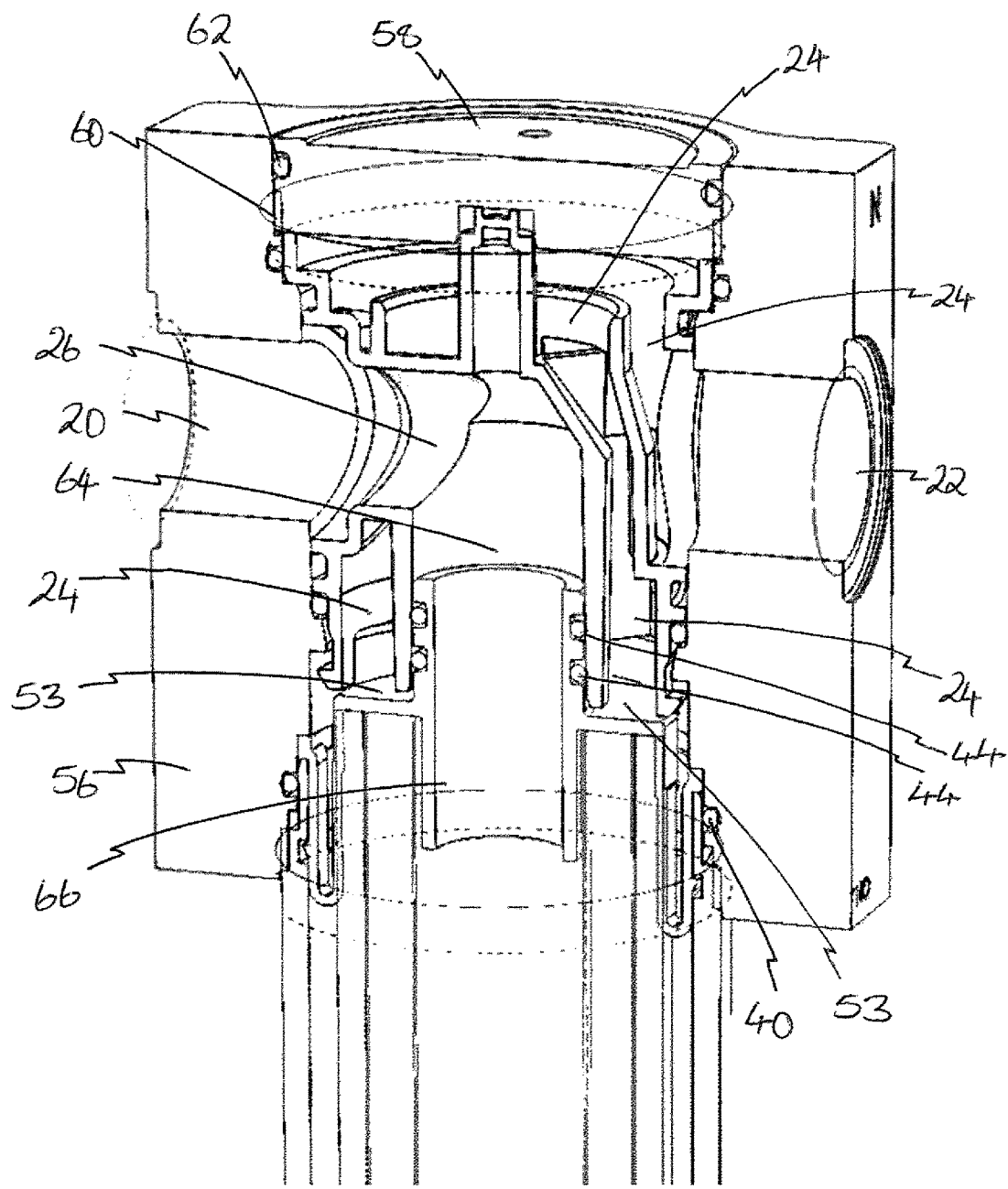
FIG. 3 is a sectional perspective view of a portion of a filter apparatus of a further embodiment of the present invention.

Referring to FIGS. 3, 4 and 5, the embodiment shown therein is the same as that described in connection with FIG. 2 except that the tube of thermoplastic material that forms the head engaging portion 42 extends beyond the annular disk 53 and partially into the filter 14. This tubular extension, indicated at 66, forms part of the filter engaging portion and also acts to direct the flow of compressed air further down the filter 14 thereby discouraging the flow of air from taking the shortest possible route through the filter.

Assembly of the apparatus 10 will now be described. The filter 14 is connected to the connector 18. Typically the connector 18 is fitted to the filter during the manufacture of the filter. However, the connector and filter can be assembled on site. The filter 14 and connector 18 are inserted into the bowl 16 so that the flexible members 46 flex inwardly and the protrusions 48 click into the recess 50. The filter 14 and connector 18 are now securely retained within the bowl and the filter and connector can be brought into engagement with head 12. As the mutually engaging threads 36 and 38 come into engagement with each other the head engaging portion 42 extends into the second conduit 26 so that the O-rings 44 seal the head engaging portion 42 within the second conduit 26. Once the mutual engaging threads 36 and 38 are fully engaged with each other the manual engaging portions 52 of flexible members 46 abut the head 12 further preventing movement of the filter 14 and connector 18. The filter apparatus 10 is now ready for use.

When the filter 14 is due for replacement the bowl 16 is unscrewed from head 12, which are sealed relative to each other by O-ring 40. To rotate the bowl relative to the head of the stiction force of O-ring 40 must be overcome and this makes the initial turning of the bowl relative to the head quite difficult. The interference fit of the O-rings 44 with the second conduit attempts to retain the connector 18 and filter 14 in engagement with the head 12. However, because the wedge shape protrusions 48 extend into the recess 50, the force holding the connector 18 and filter 14 in engagement with the bowl 16 is greater than the interference fit of the O-rings and, as a result, the connector and filter are retained within the bowl 16. Because the recess 50 extends annually around the whole of the inside surface of wall 28 the protrusions 48 remain stationary and within the recess 50 as the bowl is rotated. The stiction force of the two O-rings 44 prevents the connector 18 from rotating. The annular recess 50 therefore allows the bowl 40 to rotate relative to the connector 18 and therefore only the stiction force of the O-ring 40 must be overcome to initially rotate the bowl relative to the head. Once that rotation has started the stiction force of the O-rings 44 on the walls of second conduit 26 is overcome as the threads 36 and 38 drag the connector out of engagement with the second conduit 26. It is the mechanical advantage provided by the threads 36 and 38 that allows this stiction force of the two O-rings 44 to be easily overcome.

Once the threads 36 and 38 are disengaged the bowl, filter and connector need only be moved down a distance sufficient for the head engaging portion 42 of connector 18 to pass under the head 12. This distance is the distance from the uppermost edge of the connector 18 to the lowermost edge of the head 12, being indicated at D1 in FIG. 1. This is significantly less than the distance D2, which is the distance from the uppermost edge of the bowl 16 to base 27 of filter 14, which is the distance that the bowl would have to travel if the filter were retained in engagement with the head 12.

Once the bowl is removed from the head the manual engaging portions 52 can be pressed radially inwards by the operator by hand which releases the protrusions 48 from the recess 50. By maintaining a grip on the manual engaging portions 52 the operator lifts the connector 18 and filter 14 from the bowl. Because the manual engaging portions 52 are away from the filter 14 (which is commonly coated with dirty oil at the time it needs replacing) the operator is able to remain clean and can simply drop the filter and connector into a bag for disposal.

It will be appreciated by persons skilled in the art that the above embodiments have been described by way of example only and not in any limitative sense, and that various alterations and modifications are possible without departure from the scope of the protection which is defined by the appended claims. For example, the above embodiments have been described in connection with the filtering of compressed air. However, such filter apparatus can be utilised to dry any stream of gas whether it is compressed or not. Furthermore, the flow of air in the embodiments described above enters the filter down the central bore, passes through the filter wall and exits from the outside of the filter. As a result, this flow of air can be described as in to out. However, the flow in this apparatus could be reversed by making the inlet and the outlet and the outlet the inlet. As a result, compressed air would flow through the first conduit 24 and into the gap between the filter 14 and the bowl 16, would pass through the filter 14, up its central bore passing into the second conduit 26.

The invention claimed is:

1. A filter apparatus for filtering a stream of gas, the apparatus comprising:
   a head having an inlet and an outlet, the head including a first flow conduit connected to one of said inlet and said outlet and a second flow conduit connected to the other of said inlet and said outlet;
   a filter for filtering the gas flowing though the filter apparatus;
   a bowl connected to and sealed relative to said head for containing said filter, said bowl having at least one internal surface having at least one recess therein;
   a connector for connecting said filter to said head and said bowl, the connector including:
      a head engaging portion for engaging and sealing around said second flow conduit;
      a filter engaging portion for retaining said filter, said connector thereby directing the flow of the gas between said filter and said second flow conduit; and
      a bowl engaging portion comprising two or more flexible U-shaped legs, each respective U-shaped leg having at least one protrusion for insertion into said recess.

2. An apparatus according to claim 1, wherein each respective U-shaped lei comprises a manual engaging portion allowing an operator to flex the flexible members.

3. An apparatus according to claim 2, wherein said manual engaging portions in use are located adjacent an edge of said bowl.

4. An apparatus according to claim 1, wherein said recess is annular.

5. An apparatus according to claim 1, wherein said filter is fixedly connected to said connector.

6. An apparatus according to claim 1, wherein said first flow conduit located substantially around said second flow conduit.

<p align="center">* * * * *</p>